W. F. E. CASSE.
PASTEURIZING APPARATUS.
APPLICATION FILED MAR. 20, 1911.
1,031,913.
Patented July 9, 1912.
2 SHEETS—SHEET 1.
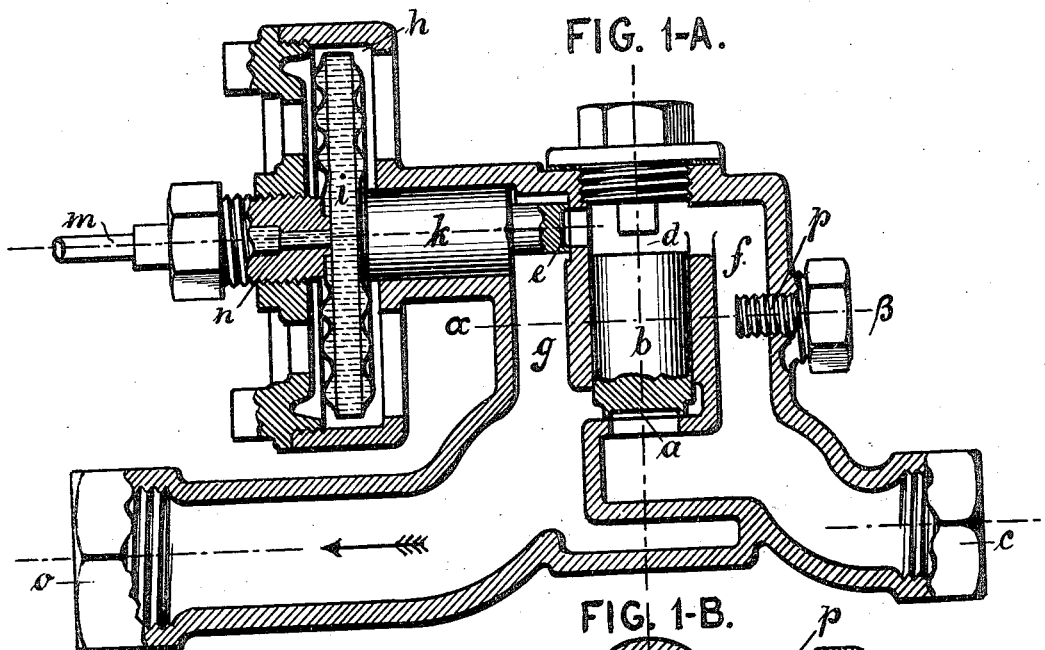
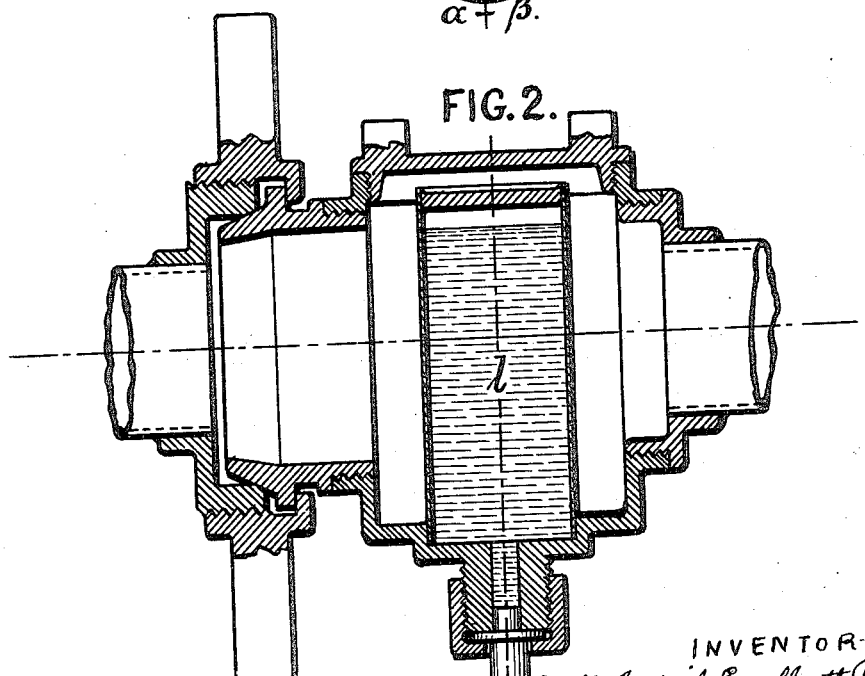
WITNESSES:
John C. Sanders
John A. Percival.
INVENTOR:
Wolff Frederick Engelbreth Casse
BY
ATT'Y.

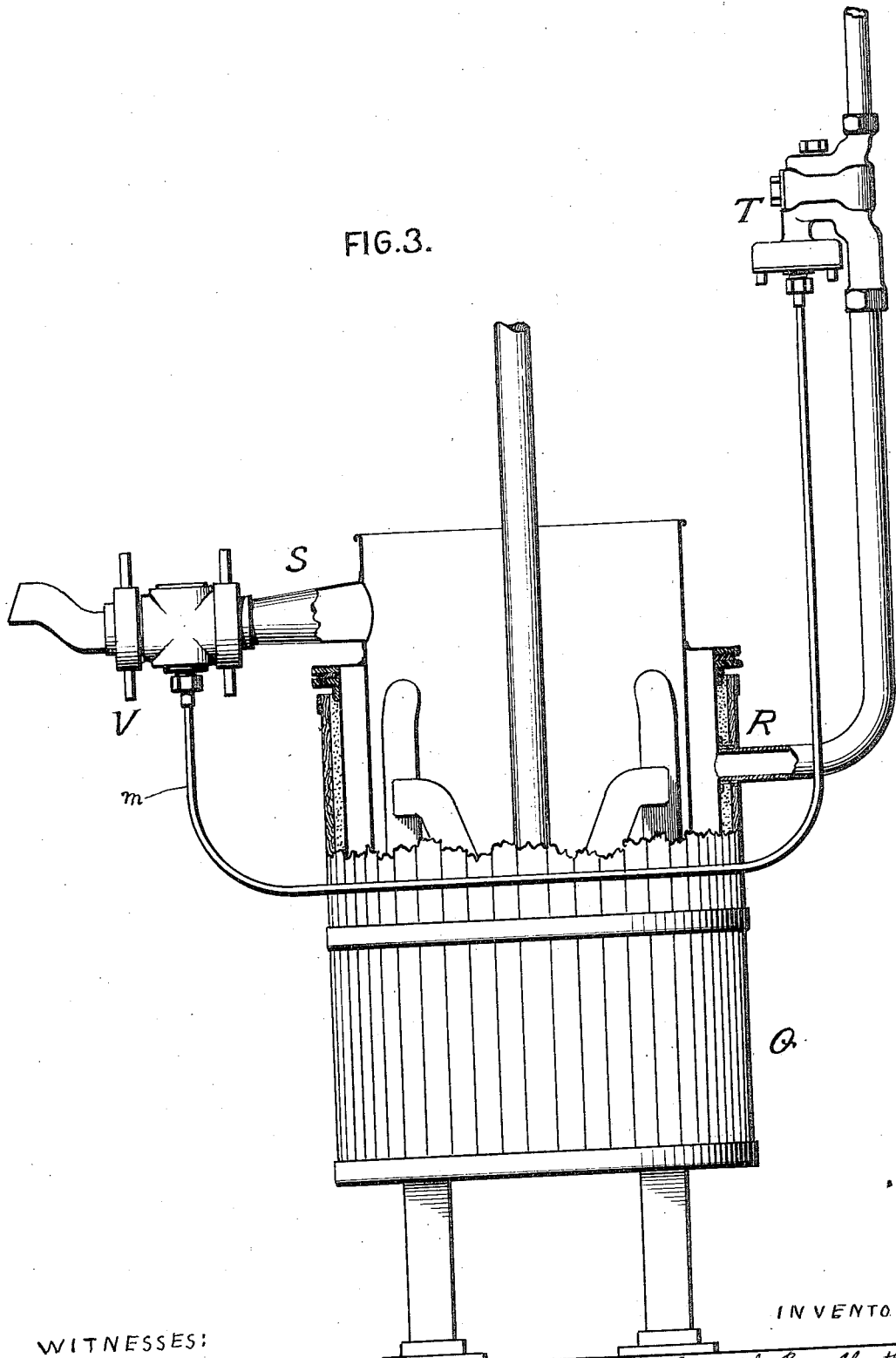

UNITED STATES PATENT OFFICE.

WOLFF FREDERIK ENGELBRETH CASSE, OF COPENHAGEN, DENMARK, ASSIGNOR TO THE STOCK COMPANY TEMPERATOR, OF COPENHAGEN, DENMARK.

PASTEURIZING APPARATUS.

1,031,913.  Specification of Letters Patent.  Patented July 9, 1912.

Application filed March 20, 1911. Serial No. 615,530.

*To all whom it may concern:*

Be it known that I, WOLFF FREDERIK ENGELBRETH CASSE, subject of the King of Denmark, residing at 29 Kocksvei, Copenhagen, Denmark, have invented new and useful Improvements in Pasteurizing Apparatus, of which the following is a specification.

This invention relates to pasteurizing apparatus and is more especially adapted for devices of this character in which milk or cream is to be pasteurized.

One of the objects of the invention is to provide an apparatus in which the liquid to be treated shall be subjected to a practically constant degree of heat.

Another object is to provide an apparatus which will be simple in construction, and, therefore, not liable to get out of order, which will be efficient in use, and which will be comparatively inexpensive to manufacture.

Other objects will be in part obvious and in part pointed out hereinafter.

In the accompanying drawings, in which an illustrative embodiment of the invention is shown, and in which the same reference characters refer to the same parts in the several figures, Figure 1ª is a longitudinal sectional view of the mechanism for controlling the admission of the heating medium to the pasteurizer. Fig. 1ᵇ is a sectional view taken on the line a—b of Fig. 1ª. Fig. 2 is a longitudinal sectional view of the portion of the controlling mechanism which is influenced by the pasteurized fluid. Fig. 3 is an elevational view of the pasteurizer showing the arrangement of the controlling mechanism, parts of the pasteurizer being shown in section for the sake of clearness.

Referring to Fig. 3, Q indicates a pasteurizer of any suitable construction provided with a chamber adapted to receive the liquid to be pasteurized, and which is preferably surrounded by a second chamber adapted to receive the heating medium. It is, of course, understood that the form of pasteurizer shown in the drawing is merely for illustrative purposes and forms no part of the invention.

The heating medium, which is preferably steam, enters the heating chamber by the pipe R, and the fluid which has been pasteurized leaves the pasteurizing chamber through the pipe S. The mechanism for controlling the admission of the steam, represented as a whole by T, is interposed in the pipe R, and the mechanism which is under the influence of the fluid, designated as a whole by the letter V, is interposed in the pipe S, as clearly shown in the figure. A comparatively small pipe *m* connects the controlling device positioned in the pipe S with the valve controlling mechanism which is positioned in the pipe R.

Referring now to Figs. 1ª and 1ᵇ, the mechanism for controlling the flow of the steam or other heating medium to the heating chamber is shown as consisting of a casing comprising a passage *c* adapted to communicate with a passage *o* by means of a port *a* and a valve *b* which controls the passage of the heating medium through this port. A passage *f* communicates with the passage *c* and a space *d* above the valve *b*. A port *e* is provided between the space *d* and a passage *g* which communicates with the passage *o*, and the flow of heating medium through the port *e* is controlled by an auxiliary valve *k*, which in turn is controlled in a manner hereinafter described. As clearly shown in the drawing the upper surface of the valve *b* is greater than its lower surface, from which it will be understood that, if the port *e* is closed by the valve *k*, the pressure of the heating medium acting upon the upper surface of the valve *b* will overbalance the pressure acting upon its under surface, thereby holding the valve securely upon its seat and closing the port *a*. If, however, the valve *k* is allowed to move to open the port *e*, the pressure upon the upper surface of the valve *b* will be decreased thereby allowing the valve *b* to be lifted from its seat by the pressure of the steam upon its under surface, thus opening the port *a* and permitting the flow of the heating medium from the passage *c* through the port *a* into the passage *o* and thence to the heating chamber of the pasteurizer.

In order to vary the effective area of the passage *f* and thereby vary the amount of heating medium flowing therethrough, suitable means are provided, such as a screw *p*, which may be screwed into or out of the passage, as desired.

The means for controlling the valve *k* will now be described: Within the chamber *h* of the casing is positioned a casing *i* the sides of which are formed of flexible diaphragms and the interior of the casing communicates by the pipe *m*, above mentioned, with a reservoir *l* which is positioned in the path of the liquid which has been pasteurized, as indicated at *v*. This reservoir, the pipe *m* and the casing *i* are filled with volatile fluid, as, for example, alcohol. The casing *i* is positioned with one of the flexible diaphragms in close proximity to the valve *k*. When the alcohol in the reservoir *l* attains a certain predetermined temperature, due to the pasteurized fluid, the pressure of the alcoholic vapor will increase to such an extent that the pressure thereof, acting through the liquid in the pipe *m*, will expand the walls of the casing *i*, thereby pressing the valve *k* upon its seat and closing the port *e*. If, on the other hand, the temperature of the liquid falls below the predetermined value, the pressure of the liquid vapor is decreased, whereby the pressure within the casing *i* is also decreased, thereby allowing the heating medium within the space *d* to force the valve *k* off its seat, which, as above described, enables the valve *b* to open, thereby admitting a fresh supply of the heating medium to the heating chamber of the pasteurizer. In this manner it will be understood that the temperature of the liquid which is being pasteurized will be kept substantially constant.

By turning the threaded block *n* to the right or to the left the casing *i* may be positioned closer to or farther from the valve *k*. By means of this device the temperature to which the liquid is to be heated may be varied. If the casing *i* is brought nearer the valve *b*, it, of course, follows that a lower pressure will be required to close the valve *k* than when the casing is in its original position, and, if, on the other hand, the casing *i* is moved farther away from the valve *k* it will require a greater pressure of the liquid to force the diaphragm to close the valve *k*, which means, of course, that the alcohol must be heated to a higher degree of temperature.

Having described this invention in connection with the illustrative embodiment thereof to the details of which disclosure the invention is not, of course, to be limited, what is claimed as new and what is desired to be secured by Letters Patent is set forth in the appended claim:

In pasteurizing regulating apparatus, an inlet conduit communicating with the pasteurizing apparatus and provided with a port, a reciprocating valve one end of which coöperates with said port for controlling the flow of the heating medium therethrough, the portion of said valve which registers with said port being exposed to the pressure of the heating medium, said valve being provided with a surface at its other end exposed to the pressure of the heating medium, said exposed surface being of greater area than said portion registering with said port whereby the valve is normally maintained closed, a by-pass extending around said valve and communicating with said conduit on both sides of said port, means for varying the area of the by-pass, and an auxiliary valve adapted to open and close said by-pass, whereby the pressure upon the exposed end of said first valve is relieved or maintained according to the movement of said auxiliary valve, and means responsive to the raising or lowering of the temperature of the pasteurizing liquid for controlling the movement of said auxiliary valve.

In testimony whereof I have signed my name to this specification in the presence of two subscribing witnesses.

WOLFF FREDERIK ENGELBRETH CASSE.

Witnesses:
  AXEL BERMIN,
  VALDEMAR CHRISTENSEN.